United States Patent [19]

Ozawa

[11] Patent Number: 5,396,441
[45] Date of Patent: Mar. 7, 1995

[54] SIGNAL INTERPOLATION APPARATUS AND SIGNAL INTERPOLATION METHOD

[75] Inventor: Naoki Ozawa, Akishima, Japan

[73] Assignee: Hitachi, Ltd., Tokyo, Japan

[21] Appl. No.: 180,508

[22] Filed: Jan. 12, 1994

Related U.S. Application Data

[63] Continuation of Ser. No. 592,654, Oct. 4, 1990, abandoned.

[30] Foreign Application Priority Data

Oct. 9, 1989 [JP] Japan .................. 1-262158

[51] Int. Cl.⁶ .................. H04N 9/77; G06G 7/30
[52] U.S. Cl. .................. 364/577; 348/242; 382/54
[58] Field of Search .................. 364/577, 560, 723; 358/43, 44, 41; 382/54; 348/241, 242, 246, 272, 273, 708, 675, 609

[56] References Cited

U.S. PATENT DOCUMENTS

| 4,153,912 | 5/1979 | Gold | 358/44 |
| 4,303,947 | 12/1981 | Stoffel | 358/260 |
| 4,716,455 | 12/1987 | Ozawa et al. | 358/44 |
| 4,774,565 | 9/1988 | Freeman | 358/41 |
| 5,008,739 | 4/1991 | D'Luna et al. | 358/21 R |
| 5,032,910 | 7/1991 | Cok | 358/41 |
| 5,040,064 | 8/1991 | Cok | 358/44 |

Primary Examiner—Michael Zanelli
Attorney, Agent, or Firm—Antonelli, Terry, Stout & Kraus

[57] ABSTRACT

A signal interpolation apparatus in which first signals of the same type as a first signal selected and taken out at a given time point from several types of signals having a predetermined correlationship with an original signal are taken out from a signal source by a sampling device, and second signals of a first type different from the first signals are taken out from the signal source by a second sampling device. The output signals of the first and second sampling devices are converted into a predetermined form respectively, and a coefficient of the conversion signal of the second sampling device against that of the first sampling device is determined. An output signal of the second sampling device is interpolated on the basis of the coefficient.

12 Claims, 15 Drawing Sheets

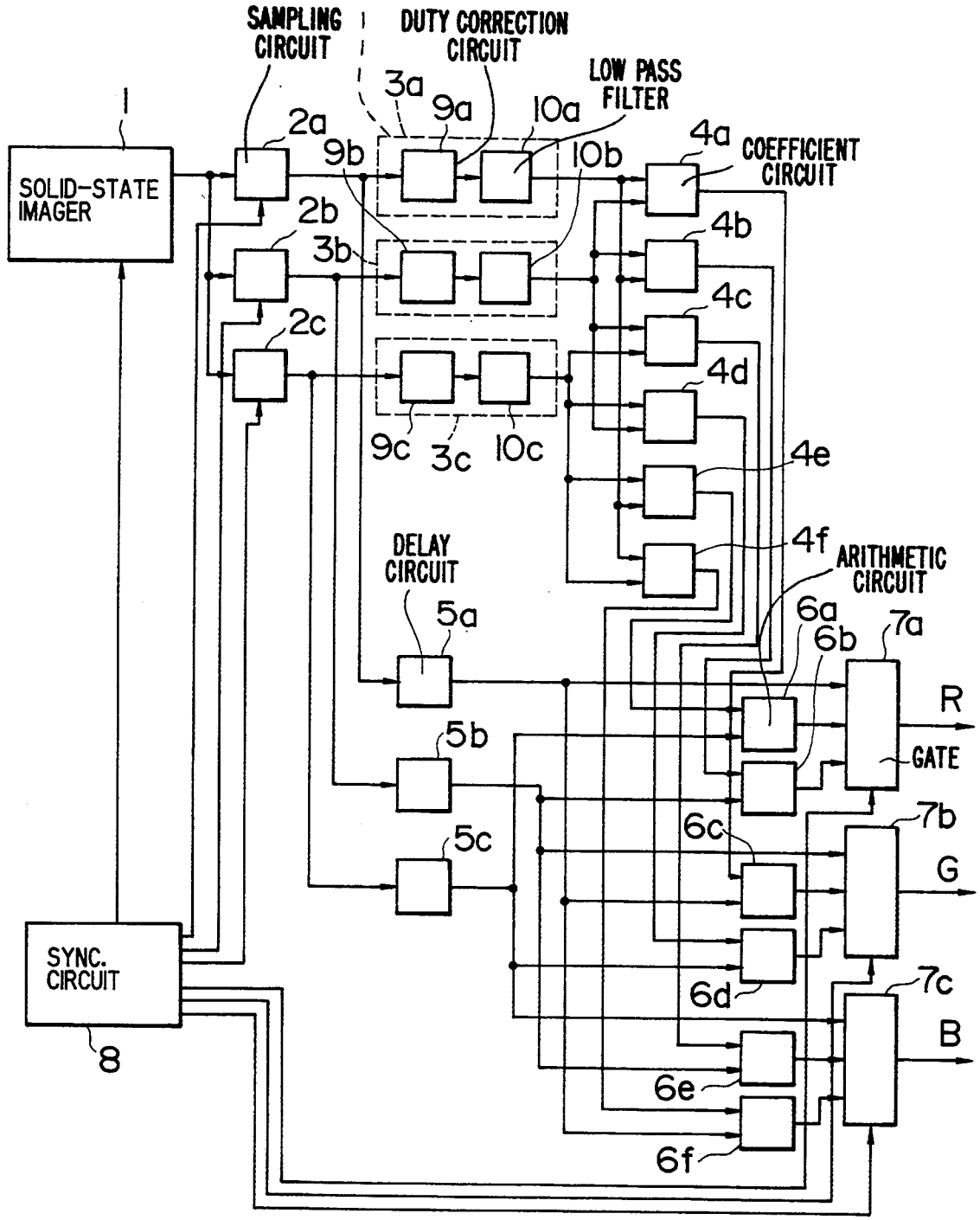

BRIGHTNESS OF OBJECT

OUTPUT SIGNAL

R (SAMPLING AND CONVERSION)

G (SAMPLING AND CONVERSION)

B (SAMPLING AND CONVERSION)

R (AFTER INTERPOLATION)

G (AFTER INTERPOLATION)

B (AFTER INTERPOLATION)

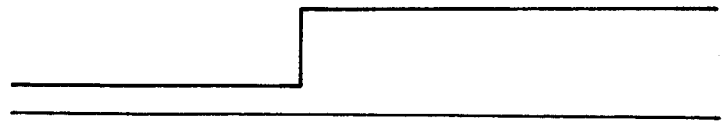
FIG. 4A (PRIOR ART) BRIGHTNESS OF OBJECT
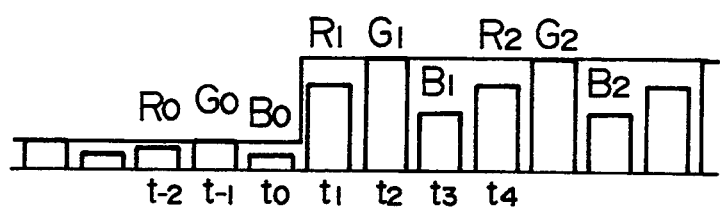
FIG. 4B (PRIOR ART) OUTPUT SIGNAL
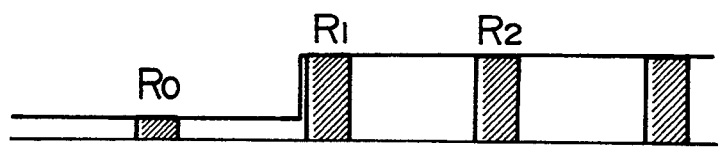
FIG. 4C (PRIOR ART) R (SAMPLING)
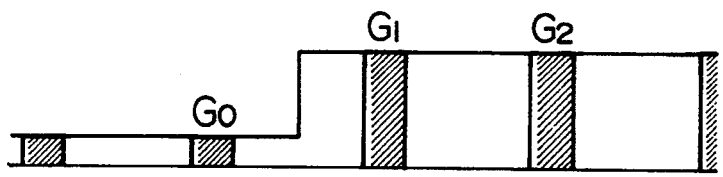
FIG. 4D (PRIOR ART) G (SAMPLING)
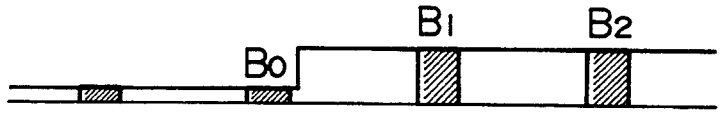
FIG. 4E (PRIOR ART) B (SAMPLING)
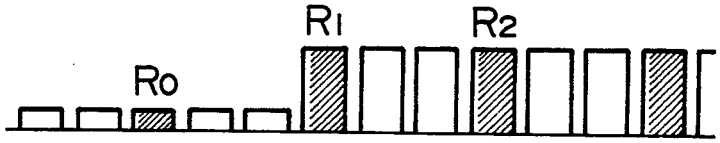
FIG. 4F (PRIOR ART) R (AFTER INTERPOLATION)
FIG. 4G (PRIOR ART) G (AFTER INTERPOLATION)
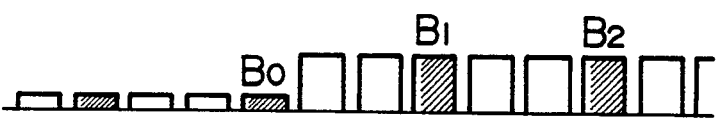
FIG. 4H (PRIOR ART) B (AFTER INTERPOLATION)

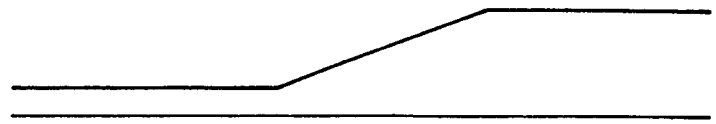
FIG. 6A (PRIOR ART) BRIGHTNESS OF OBJECT
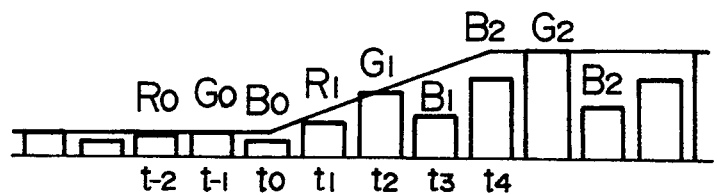
FIG. 6B (PRIOR ART) OUTPUT SIGNAL
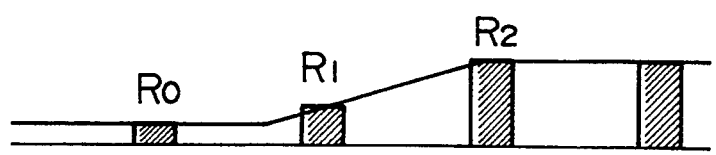
FIG. 6C (PRIOR ART) R (SAMPLING)
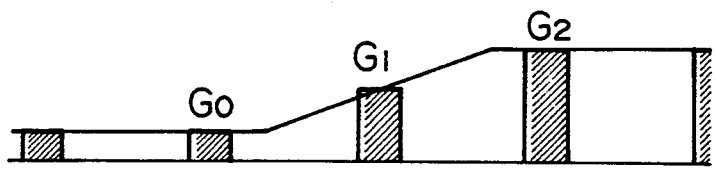
FIG. 6D (PRIOR ART) G (SAMPLING)
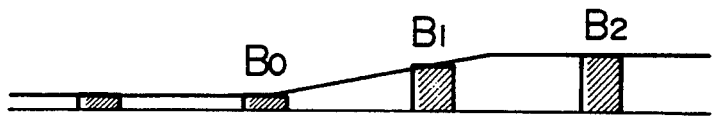
FIG. 6E (PRIOR ART) B (SAMPLING)
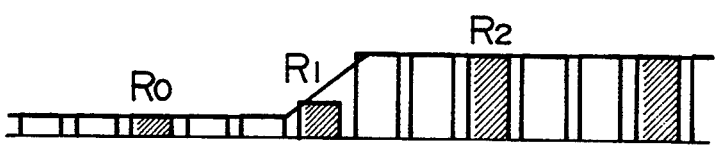
FIG. 6F (PRIOR ART) R (AFTER INTERPOLATION)
FIG. 6G (PRIOR ART) G (AFTER INTERPOLATION)
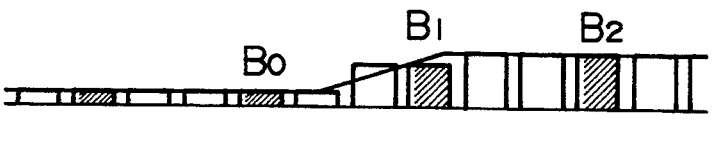
FIG. 6H (PRIOR ART) B (AFTER INTERPOLATION)

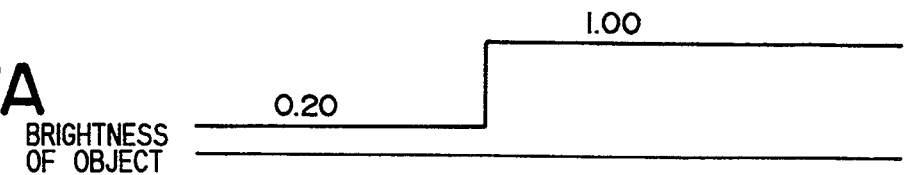
FIG. 7A BRIGHTNESS OF OBJECT
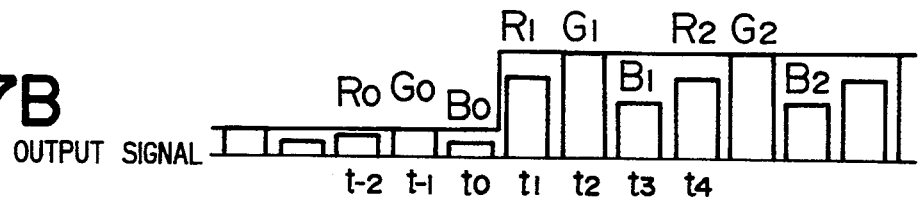
FIG. 7B OUTPUT SIGNAL
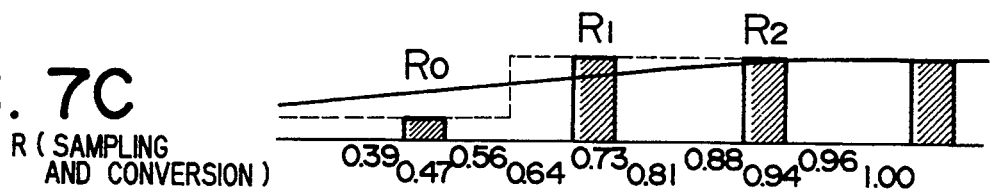
FIG. 7C R (SAMPLING AND CONVERSION)
FIG. 7D G (SAMPLING AND CONVERSION)
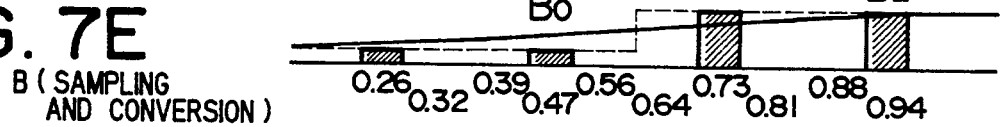
FIG. 7E B (SAMPLING AND CONVERSION)
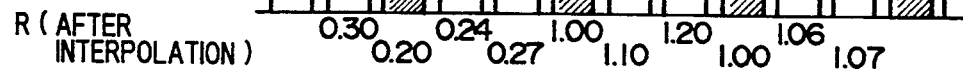
FIG. 7F R (AFTER INTERPOLATION)
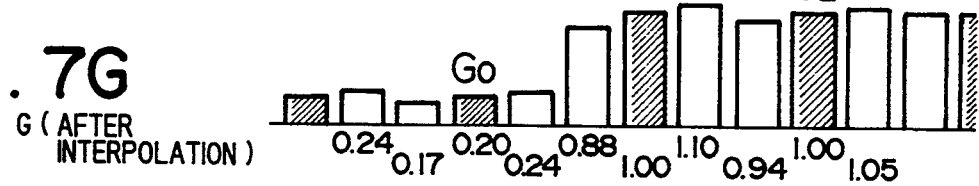
FIG. 7G G (AFTER INTERPOLATION)
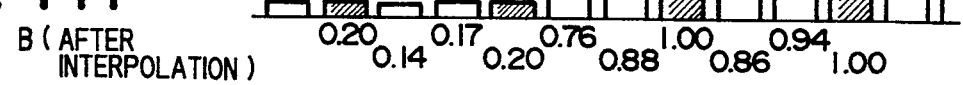
FIG. 7H B (AFTER INTERPOLATION)

Lg(f)

Lb(f)

R(f)

G(f)

B(f)

P(f)

SIGNAL INTERPOLATION APPARATUS AND SIGNAL INTERPOLATION METHOD

This application is a continuation of application Ser. No. 07/592,654, filed on Oct. 4, 1990, now abandoned.

BACKGROUND OF THE INVENTION

The present invention relates to an improvement on a signal interpolation apparatus and a signal interpolation method for eliminating the generation of a false chrominance signal, or more in particular to a signal interpolation apparatus and a signal interpolation method suitable for a single-chip color video camera using a solid-stage image sensor.

A single-chip color video camera for producing a color video signal by use of a solid-state image sensor comprising a combination of mosaic color filters is widely used as a home-use video camera and for other applications. In such a camera, pixels of a solid-state image sensor have corresponding thereto several color filters of different optical pass-bands in periodic fashion. Therefore, the spatial sampling frequency of each chrominance signal is reduced to one half or one third of the sampling frequency of the pixels, with the phases thereof differentiated from each other. As a result, each chrominance signal is liable to be affected by the sideband component generated in the sampling of the pixels, and the problem of a false chrominance signal generated in the edge or the like of an image is posed in a reproduced picture.

A method of reducing the false chrominance signal in a single-chip color video camera is disclosed, for example, in U.S. Pat. No. 4,153,912.

This method will be explained briefly with reference to FIGS. 3 and FIGS. 4A to 4H. FIG. 3 is a diagram showing an example of a conventional color filter for a single-chip color video camera, and FIGS. 4A to 4H a diagram showing output signals produced from a solid-state image sensor comprising a combination of the color filters shown in FIG. 3.

As shown in FIG. 3, the color filter comprises a plurality of filter elements having optical pass-bands of R, G, B arranged repetitively along horizontal direction in stripes, each filter element corresponding to each pixel of the solid-state image sensor. When images with a brightness changing in step along horizontal direction are formed at the same time on this color filter as shown, an output signal shown in FIG. 4B is produced from the solid-state image sensor. The R, G, B signals obtained by separating this output signal for each chrominance signal are shown in FIGS. 4C to 4E. These signals are such that the R signal, for example, is produced but not the G, B signal at time point t1, while the G signal is obtained but not R, B signal at time point t2.

In a conventional method, R1 obtained at time point t1 is compared with R0, R2 produced at time points t-2, t4 before and after a sample to determine which, R0 or R2, is nearer to R1. If R1 is found nearer to R0, the signals G0, B0 obtained before t1 are used, while if R1 is nearer to R2 or near to both R0 and R2 to the same extent, then G1, B1 obtained after t1 are used, so that the G and B signals to be obtained at t1 are interpolated. The R, G, B signals shown in FIGS. 4F to 4H are produced by performing a similar operation at each time point when a given pixel signal is produced. As shown, according to the conventional method described above, the sampling frequency of R, G, B signals is capable of being rendered equal apparently to that of pixels. Also, as obvious from the diagrams, the period when each signal changes with the brightness of the image coincides in the period from t0 to t1, and the phase shift between the signals at the edge of an image is eliminated. As a result, a false chrominance signal which otherwise might be generated at a sharp edge of an image is prevented.

In the case of an image the brightness level of which undergoes a gentle change between t0 and t4 as shown in FIG. 5, for example, an output signal as shown in FIG. 6B is produced from the solid-state image sensor. If this signal is separated into each color signal and processed as described above, the R, G, B signals shown in FIGS. 6F to 6H are obtained. As clear from the diagram, the R signal changes from dark to bright state during the period between t0 and t2, and the G, B signals during the periods between t1 and t3 and between t1 and t4 respectively. The resultant phase shift of the periods of change of each chrominance signal is presented as a false chrominance signal in a reproduced picture.

The problem of the above-mentioned conventional method lies in that although a false chrominance signal may be reduced since the chrominance signals are capable of being changed while kept in phase at an edge of a sharply-changing image, a sufficient improvement is not achieved for an image undergoing a gentle change, thus generating a false chrominance signal.

SUMMARY OF THE INVENTION

The object of the present invention is to provide a signal interpolation apparatus and a signal interpolation method in which no false chrominance signal is generated even at an edge of an image whose brightness level undergoes a gentle change.

In order to achieve the above-mentioned object, according to the present invention, there is provided a signal interpolation apparatus and a signal interpolation method comprising a plurality of means described both below and in the scope of claims, which means are specifically used in the process of generating a plurality of types of signals interpolated in the required period and produced from a signal source, which signals are taken out by predetermined means for sequentially and repetitively selecting an original signal and a plurality of types of signals having a predetermined correlationship with each other.

1. A signal interpolation apparatus comprises first sampling means for taking out a first train of signals of the same type as a first signal selectively produced out of several types of the signals at a given time point from the signal source, second sampling means for taking out a second signal train of a type different from the first signal train in similar manner from the signal source, first and second conversion means for converting output signals of the first and second sampling means into a predetermined form respectively, coefficient means for determining a coefficient of an output signal of the second conversion means in contrast to an output signal of the first conversion means, arithmetic means for processing an operation between the output signal of the coefficient means and the first signal, and interpolation means for interpolating the output signal of the second sampling means with the output signal of the arithmetic means.

The signal train taken out of the signal source has a period longer than the repetitive period of the signal of the signal source, so that the second signal has not yet been selected at the time of selecting the first signal, for instance. As a result, the second signal is required to be interpolated at such a time point, for example, in the second signal train.

The means under consideration is for interpolating the second signal using the first signal at the time of selecting the first signal. For this purpose, the correlationship between the first and second signals contained in the original signal is determined in configuration whereby the second signal is interpolated.

In order to determine this correlationship, as described above, the output signals of the first and second sampling means are converted into a predetermined form capable of producing a correlationship, whereby a coefficient of correlationship between the two signals is determined. The means in Item 1 is associated with FIG. 1 or FIGS. 9 to 13.

2. In Item 1 above, the means for conversion into a predetermined form uses a low-pass filter for producing a low-frequency component of an input signal.

Specifically, the means under consideration is for producing a signal output close to a direct current of the first and second signals around the selected first signal through a low-pass filter. This output provides the correlationship between the first and second signals. This means corresponds to FIG. 1.

3. As an alternative, in Item 1 above, the conversion means for conversion into a predetermined form is for producing an output signal as a sum of squares of the frequency components contained in the input signal taken over a predetermined area of frequency.

This means is capable of conversion, by power-detection means, in such a manner that the correlationship between the first and second signals is larger than in the case of Item 1. The means under consideration corresponds, for example, to FIG. 9.

4. As another alternative, in Item 1 above, the means for conversion into a predetermined form is for producing an output signal as a sum of squares of instantaneous values of a signal corresponding to a low-frequency component of an input signal over a predetermined length of time.

This means is for conversion by the low-pass filter and the power-detection means in such a manner that the correlationship is larger than in the case of Item 2.

As a result, it is possible to secure a signal on time axis representing a sum of squares of the frequency components contained in the input signal described in Item 3 above over a predetermined area of frequency. The means under consideration corresponds to FIG. 9 or 10.

5. In Items 1 to 4 above, the sampling means is for taking a signal of the same type as the first or second signal respectively out of a signal source in the form of a signal train in spatial horizontal direction. The means under consideration corresponds to FIG. 1 or FIGS. 9 and 10.

6. In Items 1 to 4 above, the sampling means is for taking out a signal of the same type as the first or second signal from a signal source in the form of a signal train in the vertical direction spatially containing the first signal. The means under consideration is not only for interpolation in vertical direction but also permits interpolation in horizontal and vertical directions at the same time. This means corresponds to FIGS. 11 to 13.

7. In items 1 to 6 above, the arithmetic means is for multiplying the output signal of the coefficient means with the first signal. The means under consideration corresponds to FIG. 1 or FIGS. 9, 10, etc.

8. Also, a signal interpolation method comprises the steps of taking out a first signal train of the same type as the first signal selected and taken at a given time point out of the plurality of signals from the signal source, taking out a second signal train including signals of a type different from the first signal train from the signal source, converting the first and second signal trains into a predetermined form respectively to produce first and second conversion output signals, determining the coefficient of the second conversion output signal in contrast to the first conversion output signal, performing the arithmetic operation between the coefficient and the first signal, and interpolating the second signal train by the signal resulting from the arithmetic operation.

9. As a method of converting a signal train into a predetermined form in Item 8 above, a low-frequency component of an input signal is produced from a low-pass filter.

10. As a method of converting a signal train into a predetermined form in Item 8 above, an output signal is produced as a sum of squares of the frequency components contained in the input signal taken over a predetermined area of frequency.

11. As a method of converting a signal train into a predetermined form in Item 8 above, an output signal is produced as a sum of squares of instantaneous values of signal corresponding to the low-frequency components of an input signal of the signal train taken over a predetermined length of time.

12. In Items 8 to 11 above, the above-mentioned signal train is taken out of the signal source in spatially horizontal direction as signals of the same type as the first or second signal respectively.

13. In items 8 to 11 above, the above-mentioned signal train is taken out of the signal source in vertical direction spatially containing the first signal as signals of the same type as the first or second signal respectively.

14. In items 8 to 13 above, the above-mentioned arithmetic operation is multiplying the coefficient by the first signal.

The items 8 to 14 above relate to a signal interpolation method respectively corresponding to Items 1 to 7.

As will be seen from above, the means under consideration is such that by use of a first signal selected at a time point in a signal source, a second signal not obtained at the particular time point is generated and interpolated, thereby making it possible to generate a second signal interpolated in such a manner that the repetitive period thereof is equal to the period of the signal source.

Also, each signal train taken out of a signal source is converted into a predetermined form by a low-pass filter, power-detection means or the like before determining a coefficient for interpolation in such a manner that the first and second signals may have a large correlationship even in the case of a sharply-changing image, and therefore it is possible to obtain an interpolated signal approximate to a signal originally intended. As a result of this, signal changes at edges of an image are synchronized thereby to reduce the generation of a false chrominance signal even in the case of a sharply-changing as well as a gently-changing image.

If a signal train is taken out of a signal source in vertical as well as in horizontal direction, the parallel use of interpolations in the two directions is made possible.

The generation of a false chrominance signal at an edge is thus further reduced, in view of the fact that a signal produced at a given time point is less likely to be present at the edges in both horizontal and vertical directions of an image at the same time.

BRIEF DESCRIPTION OF THE DRAWINGS

FIG. 1 is a diagram showing a configuration according to an embodiment of the present invention.

FIGS. 2A to 2H and 7A to 7H are diagrams showing signal waveforms for explaining the operation of an embodiment of the present invention.

FIGS. 4A to 4H and 6A to 6H are diagrams showing signal waveforms produced in the prior art.

DESCRIPTION OF THE PREFERRED EMBODIMENTS

An embodiment of the present invention will be explained below with reference to the configuration shown in FIG. 1 and the output signal waveforms shown in FIGS. 2A to 2H.

Figure 3:
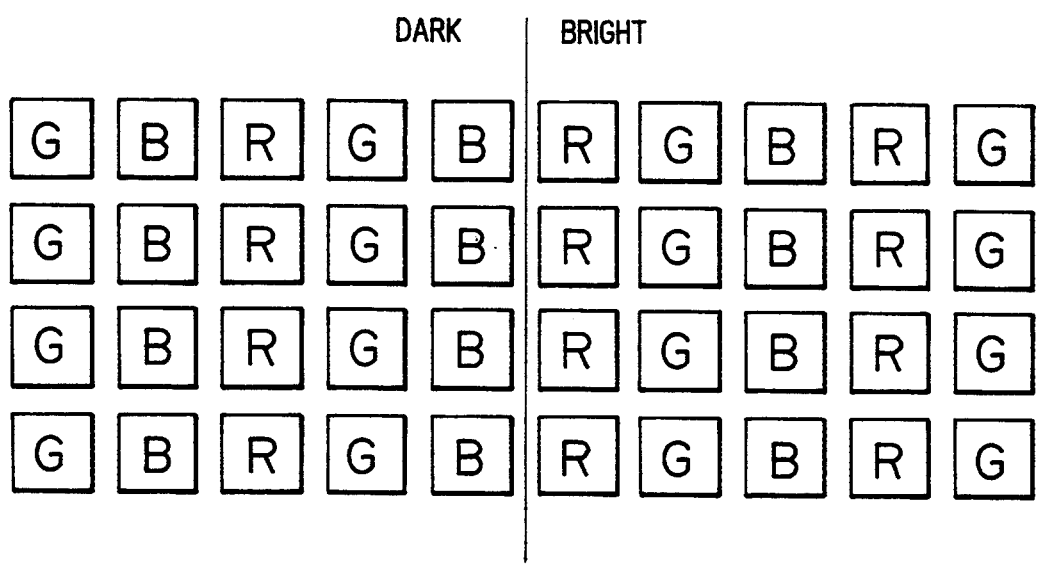
FIGS. 3 and 5 are diagrams simultaneously showing a color filter and an image pattern used with an embodiment of the present invention.

In a signal interpolation apparatus shown in FIG. 1, a solid-state imager 1 is combined with a color filter similar to the one used with the prior art shown in FIG. 3. Also, reference numerals 2a, 2b, 2c designate sampling circuits for separating the signal produced from the solid-state imager 1 into R, G, B signals, numerals 3a, 3b, 3c conversion circuits for converting output signals of the sampling circuits into a predetermined form respectively, and numerals 4a, 4b, . . . , 4f coefficient circuits for determining a coefficient representing the relationship between output signals of different pairs of the conversion circuits from the same output signals. Numerals 5a, 5b, 5c designate delay circuits for matching the timings between output signals of a sampling circuit and a conversion circuit, numerals 6a, 6b, . . . , 6f arithmetic circuits for regulating the output signals of the delay circuits in accordance with the magnitude of the output signals of the coefficient circuits, and numerals 7a, 7b, 7c gate circuits for producing R, G, B signals as intended by switching the output signals of the delay circuits and the arithmetic circuits. Numeral 8 designates a sync circuit for generating various sync signals.

Figure 2A:
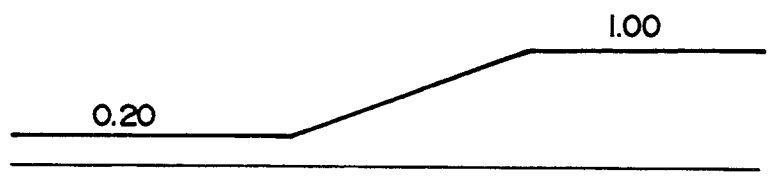
Figure 2B:
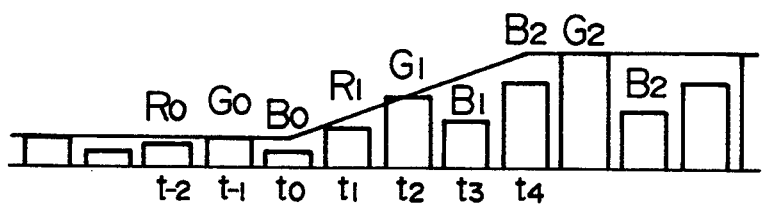
Figure 2C:
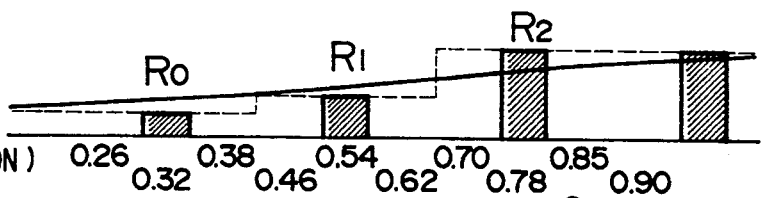
Figure 2D:
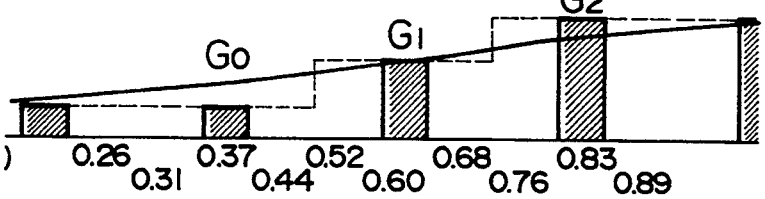
Figure 2E:
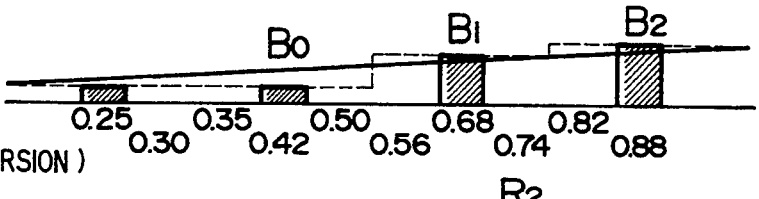
Figure 5:
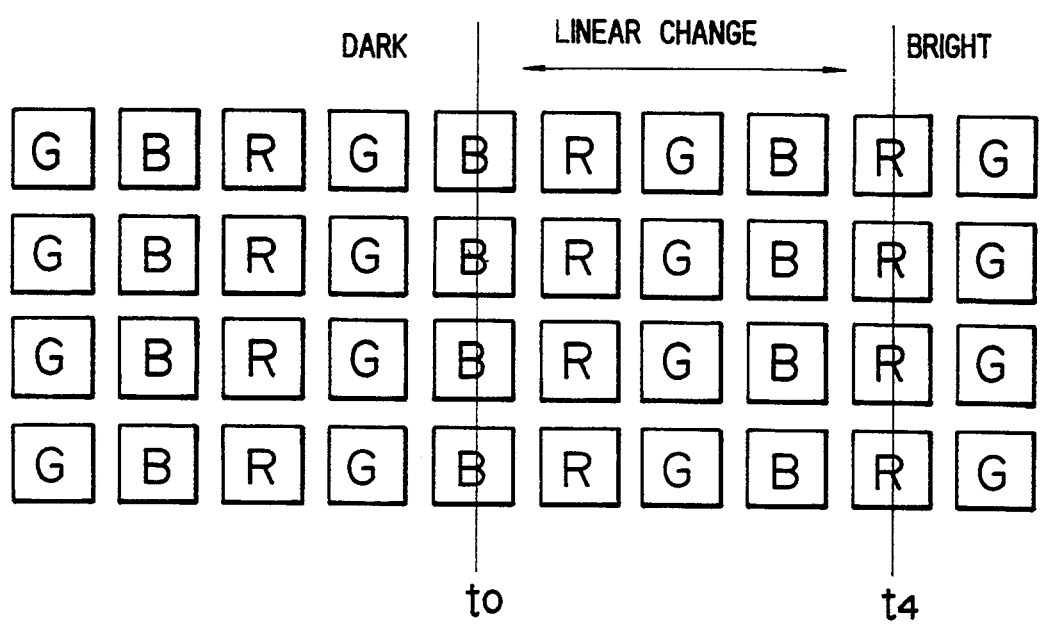

Now, the operation of the signal interpolation circuit shown in FIG. 1 will be explained with reference to a case of picking up an image with the brightness thereof gently changing as shown in FIG. 5. In the apparatus shown, an output signal of FIG. 2B is produced from the solid-state imager 1 (Same as in FIG. 6B). This signal, corresponding to the signal source described above, is applied to the sampling circuits 2a, 2b, 2c and is sampled in each phase thereby to be separated into R, G, B signals as shown in FIGS. 2C to 2E. The R, G, B signals thus separated are applied to the conversion circuits 3a, 3b, 3c for performing the signal conversion in accordance with the operation of the conversion circuits. The conversion circuits 3a, 3b, 3c include for operation, as an example, a low-pass filter for extracting only the low-frequency component of the signal or a circuit for detecting the magnitude of energy held by the low-frequency component of the signal during a specifically selected period.

In this configuration, the conversion circuits 3a, 3b, 3c are assumed to be configured of duty correction circuits 9a, 9b, 9c and low-pass filters 10a, 10b, 10c. The duty correction circuits 9a, 9b, 9c hold the signals sampled by the sampling circuits 2a, 2b, 2c until the next signal period, and by thus advancing the time relatively, convert the signal into a signal of 100% duty factor free of phase change as shown by dashed line in FIGS. 2C to 2E. Also, the low-pass filters 10a, 10b, 10c are for performing the arithmetic operations shown below.

$$so(t) = [0.98 \times \{si(t-Tc) + si(t+Tc)\} + 0.90 \times \{si(t-2 \cdot Tc) + si(t+2 \cdot Tc)\} + 0.78 \times \{si(t-3 \cdot Tc) + Si(t+3 \cdot Tc)\} + 0.64 \times \{si(t-4 \cdot Tc) + si(t+4 \cdot Tc)\} + 0.47 \times \{si(t-5 \cdot Tc) + si(t+5 \cdot Tc)\} + 0.30 \times \{si(t-6 \cdot Tc) + si(t+6 \cdot Tc)\} + si(t)]/9.14 \quad (1)$$

where si(t), so(t) are input and output signals respectively of the low-pass filter, and Tc the sampling period of pixels of the solid-state imager 1. Under this condition, equation (1) realizes a low-pass filter having a cut-off frequency as high as one fourth the sampling frequency of the pixels. As a consequence, the conversion circuits 3a, 3b, 3c produce output signals rc(t), gc(t), bc(t) respectively as shown by thin lines in FIGS. 2C to 2E. In the diagrams, numerals indicated at time points on the signal waveforms represent amplitude values expressed with the flat part of the bright section as unity.

Among the output signals thus obtained from the conversion circuits corresponding to the R and G signals, the signals rc(t), gc(t) produced from the conversion circuits 3a, 3b are added to the coefficient circuits 4a, 4b respectively thereby to produce the values of gc(t)/rc(t) and rc(t)/gc(t) respectively. In similar fashion, gc(t), bc(t) are applied to the coefficient circuits 4c and 4d respectively to produce the values of bc(t)/gc(t) and gc(t)/bc(t) respectively, while bc(t), rc(t) are applied to the coefficient circuits 4e and 4f thereby to produce the values of rc(t)/bc(t) and bc(t)/rc(t) respectively. (In the process, it is desirable to add such a function as fixing the output signal of the conversion circuits to a sufficiently small value whenever it is smaller than a predetermined value.)

If the G signal at time point t1, that is, go(t1) is to be obtained, the R signal secured at time point t1 where the time was matched at the delay circuit 5a, that is, the value r(t1) is applied to the arithmetic circuit 6c and multiplied by gc(t1)/rc(t1) obtained from the coefficient circuit 4a. The resultant output signal go(t1) holds the relationship indicated by the equation below and has a value shown in FIG. 2G.

$$go(t1) = r(t1) \times (gc(t1)/rc(t1)) \quad (2)$$

In similar fashion, the value bo(t1) making up the B signal at time point t1 is secured in the relationship shown below by applying bc(t1)/rc(t1) obtained from the coefficient circuit 4f and r(t1) derived from the delay circuit 5a to the arithmetic circuit 6f.

$$bo(t1) = r(t1) \times (bc(t1)/rc(t1)) \quad (3)$$

Figure 2F:
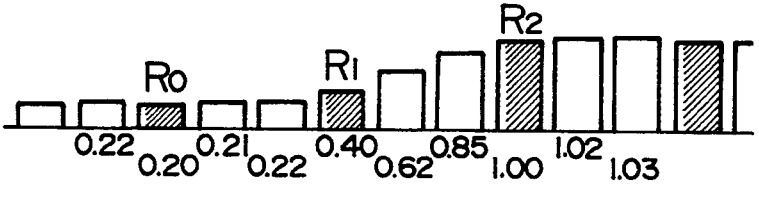
Figure 2G:
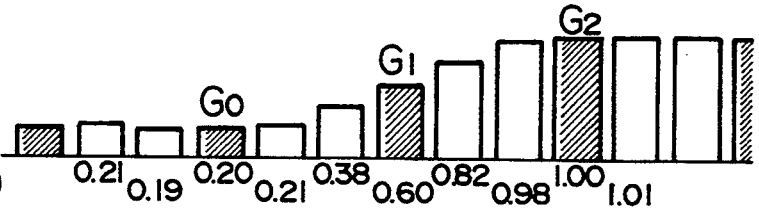
Figure 2H:
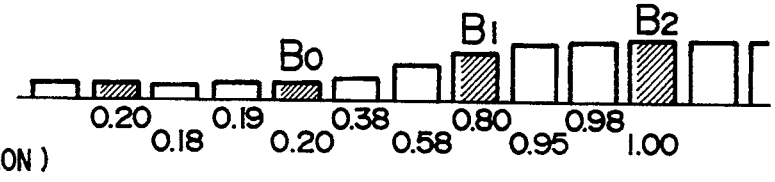

With regard to other time points, the color signal not obtainable at the particular time points is made available by multiplying the color signal obtainable at the particular time point by the output signal of the coefficient circuit for producing the ratio of the intended color signal to the color signal mentioned above at an arithmetic circuit. The output signal of the arithmetic circuit or the delay circuit is applied to the gate circuits 7a, 7b, 7c and is controlled by the signal of the sync circuit 8 in a manner to select the output signals of the delay circuit 5a, the arithmetic circuit 6c and the arithmetic circuit 6f respectively by the signal of the sync circuit 8 when the signal obtained at the particular time point is R signal. In similar fashion, even when the G or B signal is secured at the particular time point, the gate circuits are controlled in such a manner as to produce an intended signal from each gate circuit. As a result, the signals ro(t), go(t), bo(t) shown in FIGS. 2F to 2H are produced from the gate circuits 7a, 7b, 7c. As obvious from the diagrams, according to the signal interpolation apparatus of the present invention, R, G, B signals sufficiently approximate to a signal originally to be produced and substantially coincident in changing phase are produced. As a result, the false color signal which otherwise might be generated at the edges of a gradually-changing image that has thus posed far being a great problem is remarkably reduced.

On the other hand, an output signal produced from the solid-state imager 1 in picking up an image sharply changing in brightness as shown in FIG. 3 is shown in FIG. 7B. Also, the R, G, B signals produced from the sampling circuits 2a, 2b, 2c are shown in FIGS. 7C to 7E. If these signals are processed through a signal interpolation apparatus according to the present invention, the conversion circuits 3a, 3b, 3c produce output signals as indicated by thin lines in FIGS. 7C to 7E, respectively. By use of these means, the R, G, B signals are produced as shown in FIGS. 7F to 7H by the operation of the coefficient circuits 4a, 4b, 4c, the arithmetic circuits 6a, 6b, . . . , 6f and the like. As apparent from the diagrams, the waveforms of the respective signals are substantially similar to each other and change in phase. Therefore, the false chrominance signal generated at an edge of the image is sufficiently dampened. In this way, according to a signal interpolation apparatus of the present invention, the generation of a false chrominance signal is reduced as in the conventional method even at an edge of an image with the brightness under sharp change.

As described above, a signal interpolation apparatus according to the present invention is capable of reducing the generation of a false chrominance signal sufficiently even at an edge of both images with the brightness thereof changing sharply and gently respectively.

Apart from the foregoing demonstrable explanation using signal waveforms produced at various parts of an actual apparatus, the present invention will be described below in terms of the principle thereof.

Figure 8A:
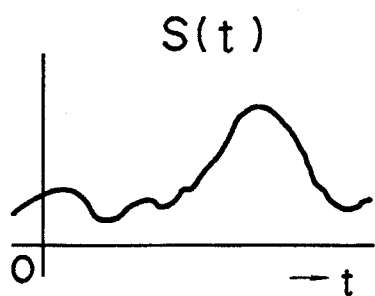
FIGS. 8A to 8R are a diagram showing signals used for explaining the operating principle of the present invention.
Figure 8B:
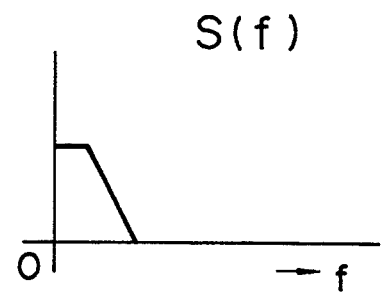
Figure 8C:
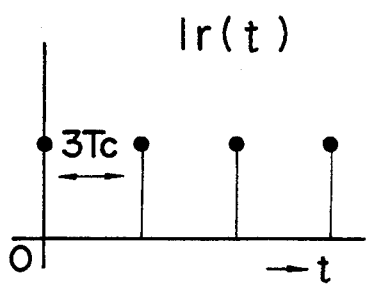
Figure 8D:
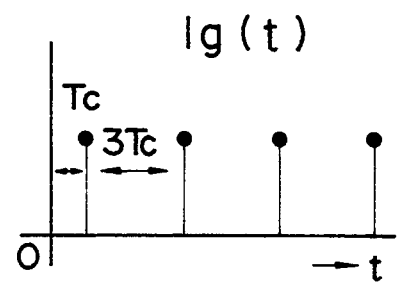
Figure 8E:
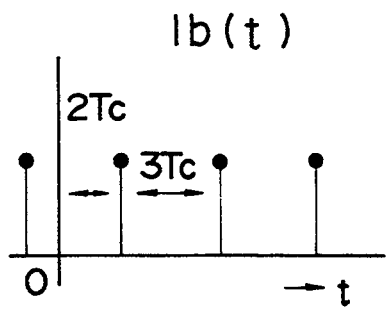
Figure 8F:
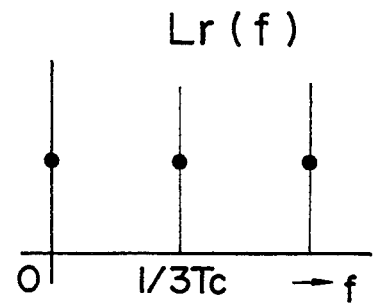
Figure 8G:
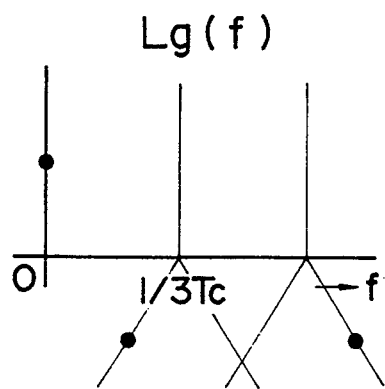
Figure 8H:
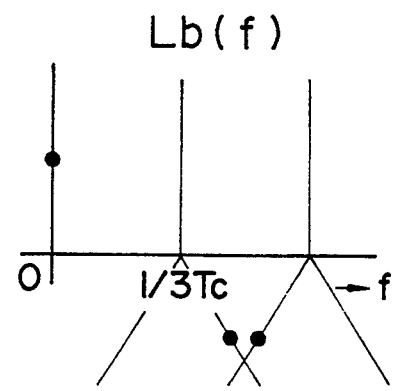

Assuming that the signal with the horizontal brightness change thereof obtained on an image as converted into time changes corresponding to the scanning is given as s(t), and the result thereof after frequency conversion as S(f). Let us consider a case in which an example of s(t) is shown in FIG. 8A and S(f) becomes 8B. Also assuming that the functions for the pixels of each color of the solid-state imager sampling an image are indicated as lr(t), lg(t), lb(t) in FIGS. 8C, 8D and 8E. The result of frequency conversion thereof is assumed to be Lr(f), Lg(f), Lb(f) shown in FIGS. 8F, 8G, 8H, where (f) to (h) show a stereoscopic model diagram in which the phase of response at each frequency in the direction rotational around the frequency axis is expressed in a rotational angle.

Figure 8I:
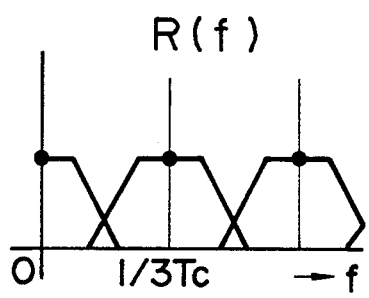
Figure 8J:
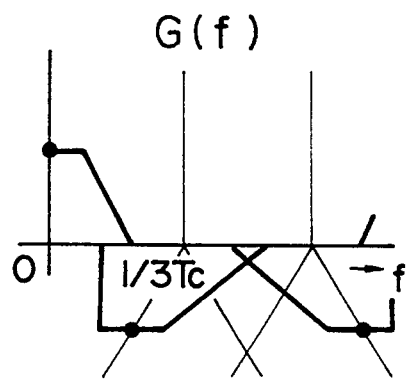
Figure 8K:
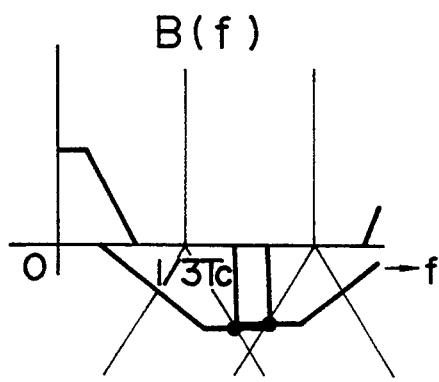
Figure 8L:
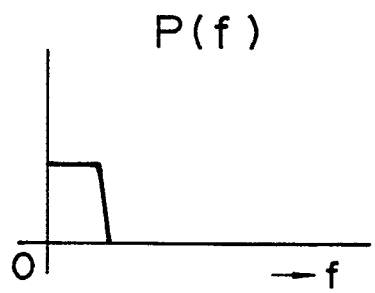
Figure 8M:
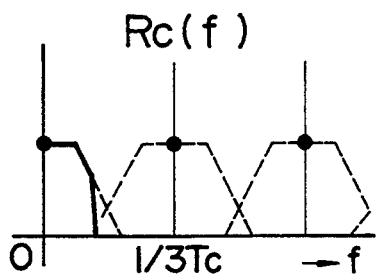
Figure 8N:
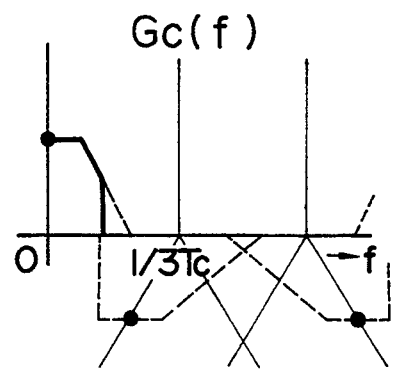
Figure 8O:
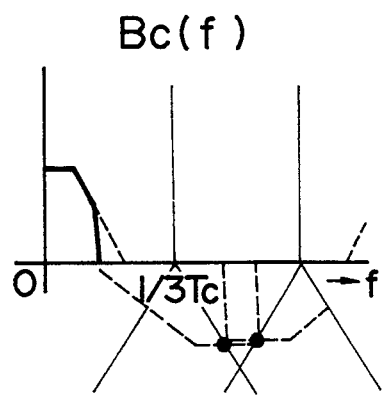

Under the aforementioned conditions, r(t), g(t), b(t) given from the sampling circuits 2a, 2b, 2c in the configuration shown in FIG. 1 are expressed by the equations below.

$$r(t) = sr(t) \times lr(t) \quad (4)$$

$$g(t) = sg(t) \times lg(t) \quad (5)$$

$$b(t) = sb(t) \times lb(t) \quad (6)$$

where sr(t), sg(t), sb(t) represent the R, G, B components respectively of an image s(t). When the theorem indicating the relationship between the original function and the function after Fourier transformation based on equations (4), (5) and (6) is used, R(f), G(f), B(f) subjected to frequency conversion of r(t), g(t), b(t) respectively are determined from the equations below.

$$R(f) = Sr(f) * Lr(f) \quad (7)$$

$$G(f) = Sg(f) * Lg(f) \quad (8)$$

$$B(f) = Sb(f) * Lb(f) \quad (9)$$

where * designates a convolution integral. From the formula relating to the convolution integral, R(f), G(f), B(f) represent FIGS. 8I, 8J, 8K respectively. If the output signal of each sampling circuit is applied to the low-pass filter having the frequency characteristic P(f) shown in FIG. 8L, the frequency components Rc(f), Gc(f), Bc(f) are expressed by the equations below respectively as shown in FIGS. 8M, 8N and 8O.

$$Rc(f) = P(f) \times (Sr(f) * Lr(f)) \quad (10)$$

$$Gc(f) = P(f) \times (Sg(f) * Lg(f)) \quad (11)$$

$$Bc(f) = P(f) \times (Sb(f) * Lb(f)) \quad (12)$$

By converting the equations (10) to (12) into a time axis, rc(t), gc(t), bc(t) are obtained as shown below.

$$rc(t) = p(t) * (sr(t) \times lr(t)) \quad (13)$$

$$gc(t) = p(t) * (sg(t) \times lg(t)) \quad (14)$$

$$bc(t) = p(t) * (sb(t) \times lb(t)) \quad (15)$$

As clear from FIGS. 8M, 8N, if Sr(f), Sg(f), Sb(f) have no high frequency component as in the case of an image changing gradually in brightness as shown in FIG. 2A to FIG. 2H, the sideband component of high harmonices generated by sampling is mixed to a lesser degree with the base-band signal. If the pass-bandwidth of the low-pass filter is set sufficiently lower than the sampling frequency of the pixels in such a case, the frequency components Rc(f), Gc(f), Bc(f) of the output signal of the low-pass filter substantially coincide with the low-frequency portions of the Sr(f), Sg(f), Sb(f).

Also, if the pass-bandwidth of the low-pass filter is sufficiently narrow, the amount of change of the output signal in a very small time interval is so small that the instantaneous value at a given time point is considered substantially equal to the DC level in the neighbourhood thereof. Specifically, in the case where the pass-bandwidth of the low-pass filter is set narrow, the instantaneous values rc(t1), gc(t1), bc(t1) at t1 may be used in place of the DC components Rc(O), Gc(O), Bc(O) determined from the pixel signal obtained around t1.

Figure 8P:
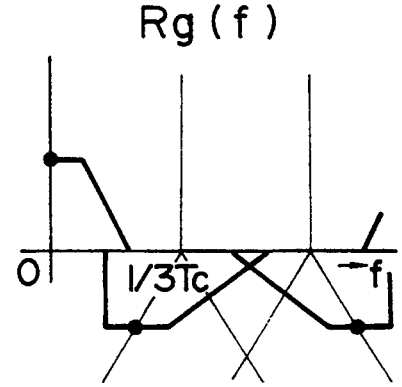
Figure 8Q:
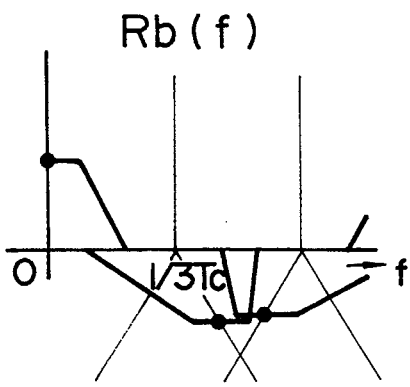

If the interpolation signal rg(t) for R is determined from the G signal and the interpolation signal rb(t) for R from the B signal as shown in the equation below, therefore, signals having a frequency component shown in FIGS. 8P, 8Q are obtained.

$$rg(t) = (rc(t)/gc(t)) \times g(t) \quad (16)$$

$$rb(t) = (rc(t)/bc(t)) \times b(t) \quad (17)$$

Figure 8R:
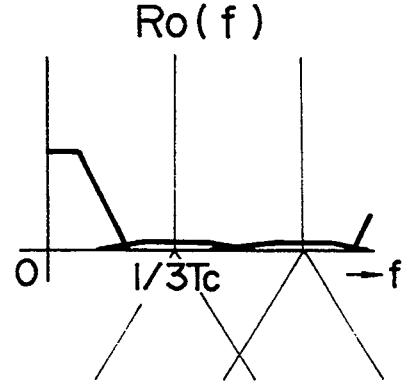

If ro(t) is determined as expressed by the equation below, the frequency component is given as shown in FIG. 8R.

$$ro(t) = r(t) + rg(t) = rb(t) \quad (18)$$

From the diagram, it is seen that as long as the correlationship between r(t), g(t) and b(t) is large (such as when a monochromatic image is involved), the sideband components generated in the first and second high harmonices are substantially offset, and the ro(t) is obtained as a signal with the sampling frequency thereof equal to that of pixels.

In the case where the image has a high frequency component with the brightness thereof sharply changing such as shown in FIGS. 7A to 7H, on the other hand, the sideband component is mixed with the output signal of the low-pass filter. In addition, the phase is different between Rc(f), Gc(f), Bc(f), and therefore Rc(f)/Gc(f) fails to represent the ratio between Sr(f) and Sg(f) any longer. Thus, rc(t)/gc(t) assumes a value different from the ratio between sr(t) and sg(t). As a result, ro(t) based on equation (16) obtained from the relationship held by equations (14) and (15), though substantially equal to a signal to be obtained originally as shown in FIG. 7F, has the gap with such a signal somewhat widened as compared with when the image has a gradually-changing brightness.

The foregoing explanation concerns a case handling R signal. The same holds true with the case where G or B signal is handled.

In this way, a signal more similar to the original signal is produced even at an edge of an image with the brightness thereof sharply changing.

Figure 9:
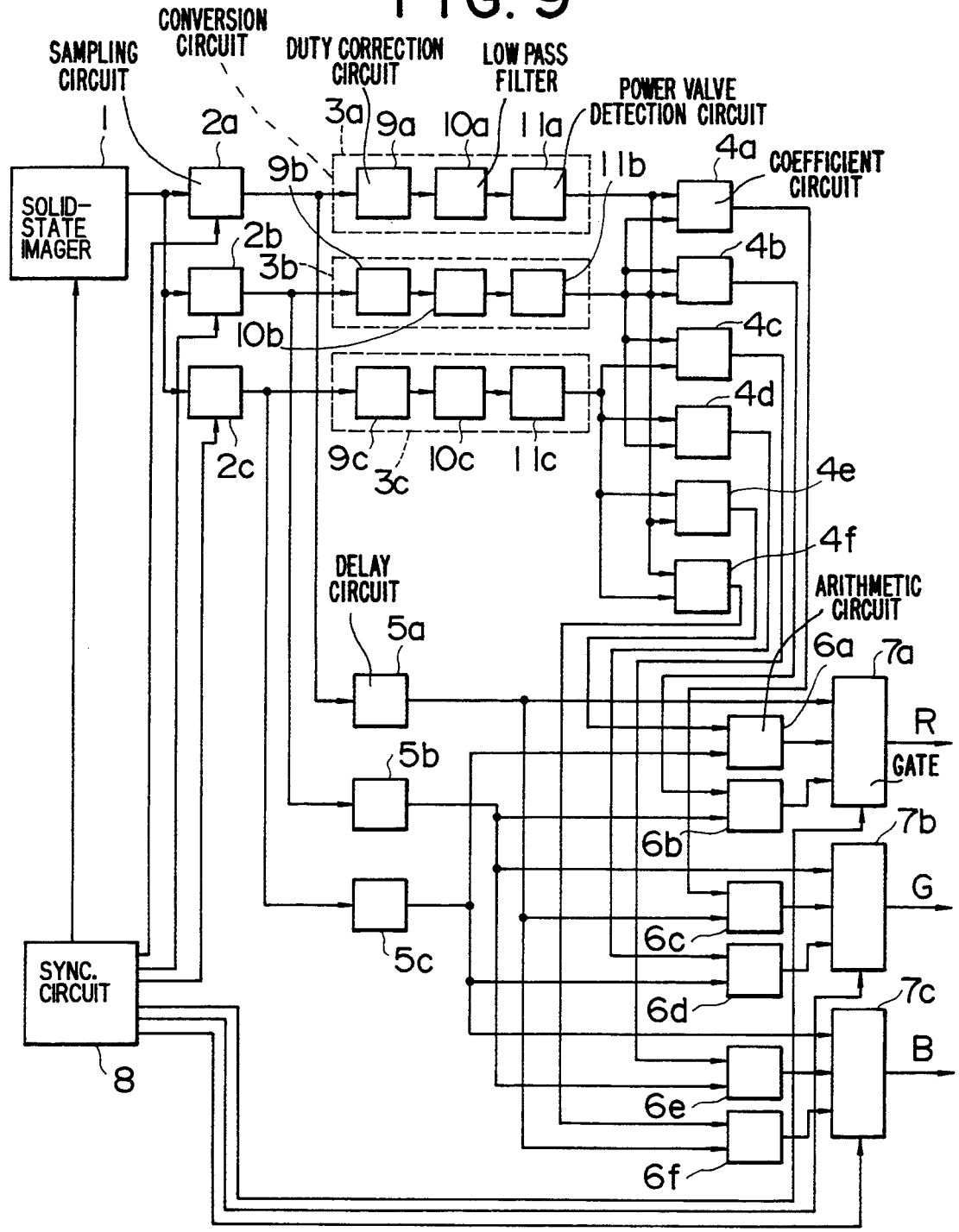
FIGS. 9 to 13 are diagrams showing other embodiments of the present invention.

Still another embodiment of the present invention is shown in FIG. 9.

The embodiment shown in FIG. 9 is different from the embodiment of FIG. 1 in that in the embodiment of FIG. 9, the conversion circuits 3a, 3b, 3c include duty correction circuits 9a, 9b, 9c, low-pass filters 10a, 10b, 10c and power value detection circuits 11a, 11b, 11c. The power value detection circuits 11a, 11b, 11c are assumed to integrate by square the frequency components of the low-pass filters 10a, 10b, 10c shown in FIGS. 8M, 8N, 8O over the whole pass-bandwidth and produce the square root thereof. As compared with the embodiment shown in FIG. 1 which utilizes only the component of zero frequency (DC component) of the output signal of a low-pass filter, the baseband component of other than the component of zero frequency is added to reduce the ratio of the sideband component in the output signal, thus reducing a false chrominance signal, even for an image having a specially large frequency component which mixes with the component of zero frequency of the base band in the form of a sideband component.

The signal obtained by the square integration of the frequency component of the output signal of the low-pass filter over the whole band may alternatively be obtained from Parseval's quality shown below by square integration of instantaneous values of the output signal of a low-pass filter produced during a predetermined period including the time point involved.

$$\int |rc(t)|^2 dt = \int Rc(f)^2 df \quad (19)$$

Figure 10:
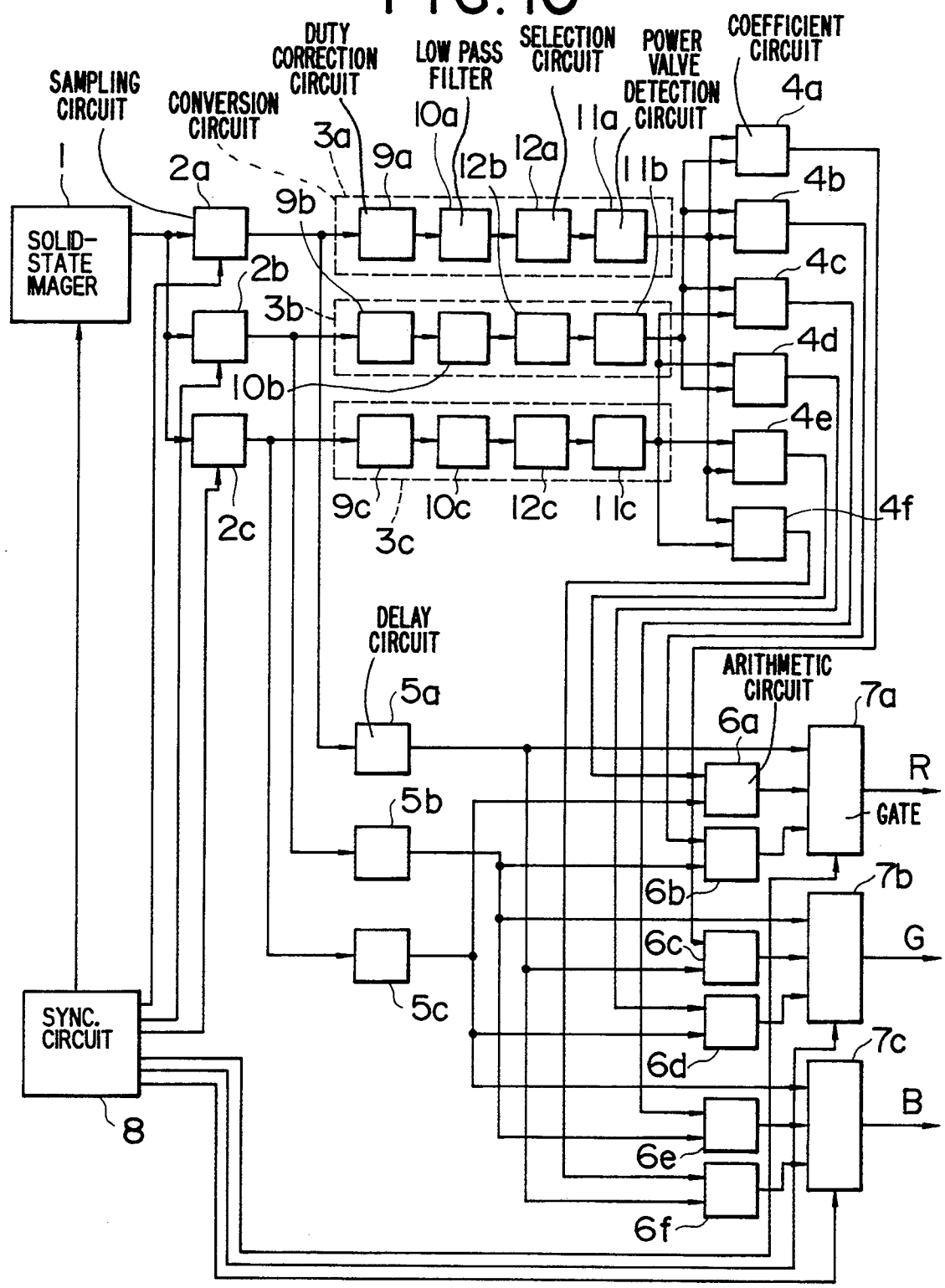

In the process, if the equation (19) is to hold effectively, it is necessary for rc(t) to converge to zero in other than the predetermined period. This is realized by adding selection circuits 12a, 12b, 12c to the output side of the low-pass filters 10a, 10b, 10c and controlling the apparatus in such a manner as to take out and apply to the power value detection circuits 11a, 11b, 11c only the signals associated with several pixels before and after the particular time point as in the still another embodiment shown in FIG. 10.

In the embodiment shown in FIG. 1, when the component of zero frequency is detected by an instantaneous value, it is necessary to reduce the signal change during a very small period, thus making it necessary to set the pass band of the low-pass filter only in a low frequency area. According to the embodiment shown in FIG. 9 or 10, in contrast, the whole pass band of the low-pass filter is subjected to integration, and therefore the bandwidth of the low-pass filter is not limited to a low-frequency band. As a result, the outputs signal of the low-pass filter produced at the particular time point is affected to lesser degree by the signal of pixels away from the particular time point. It is thus possible to prevent the effect at the edges of an image containing many sideband components from extending over a wide area.

Figure 11:
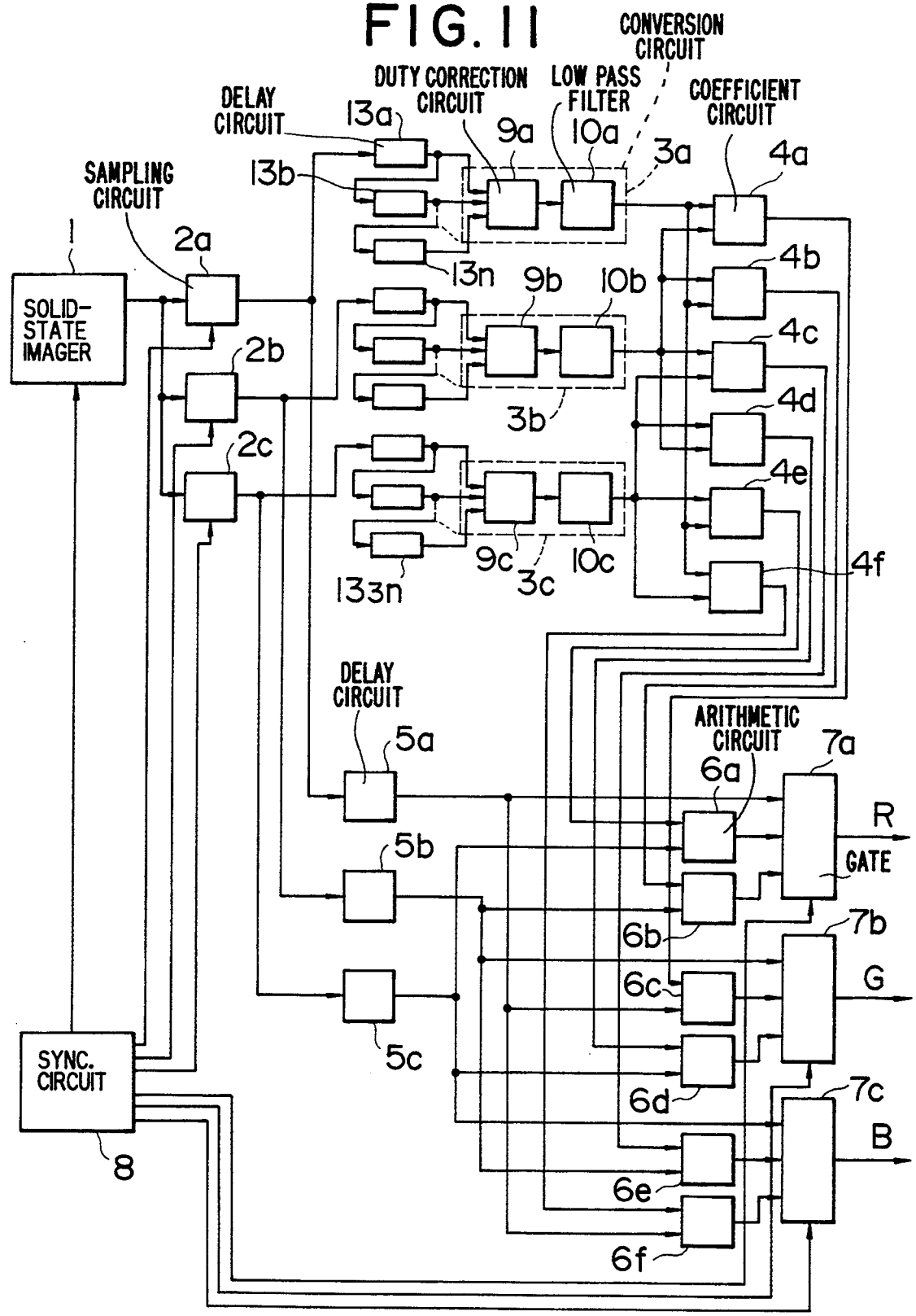

The foregoing explanation has dealt with the interpolation of pixel trains in horizontal direction of a solid-state imaging apparatus. As shown in the embodiment of FIG. 11, on the other hand, 1H delay circuits 13a, 13b, ... having a delay time of one horizontal scanning period may be used to produce signals of pixel trains in vertical direction at the same time, thereby permitting the interpolation in vertical direction in similar fashion.

Figure 12:
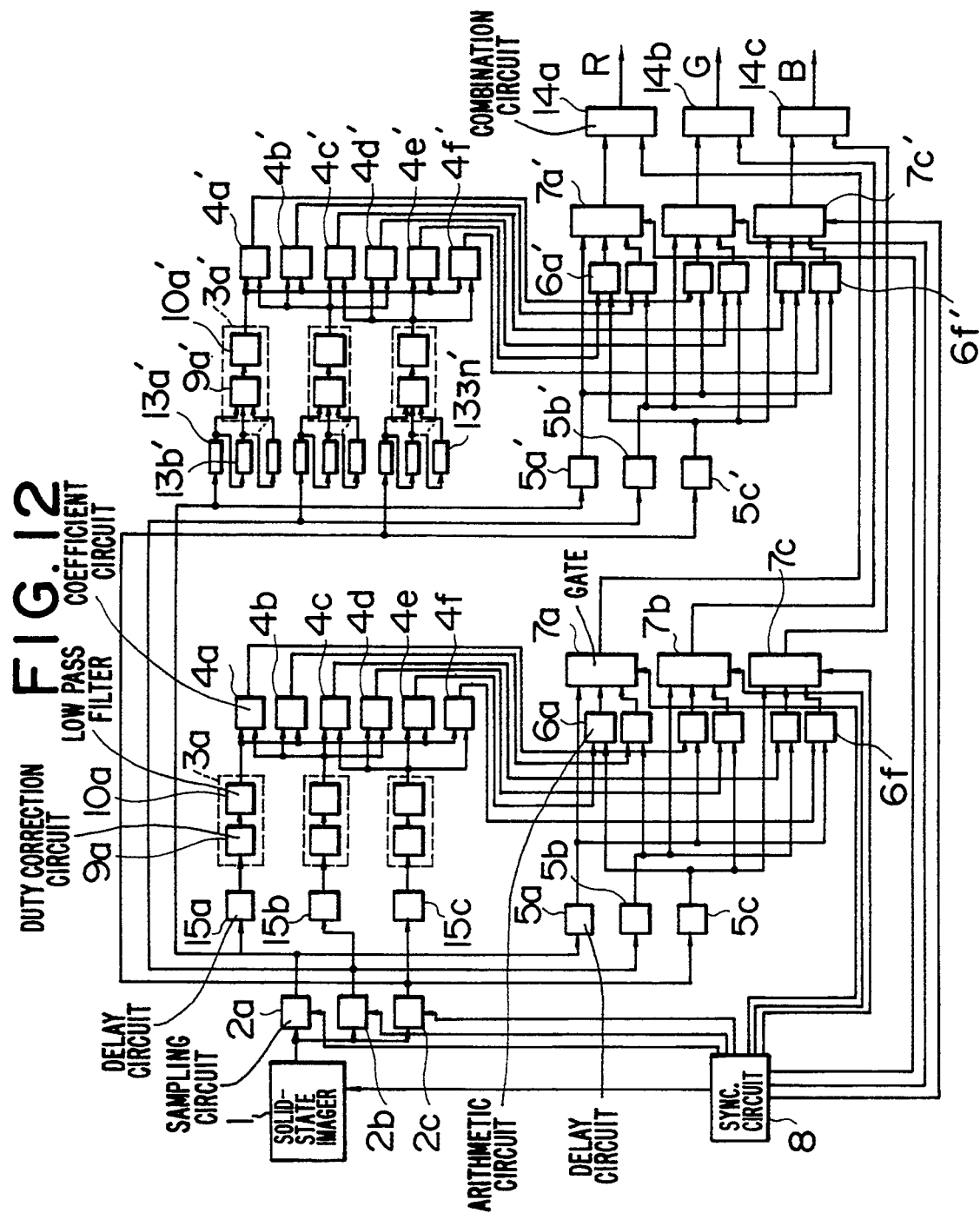
Figure 13:
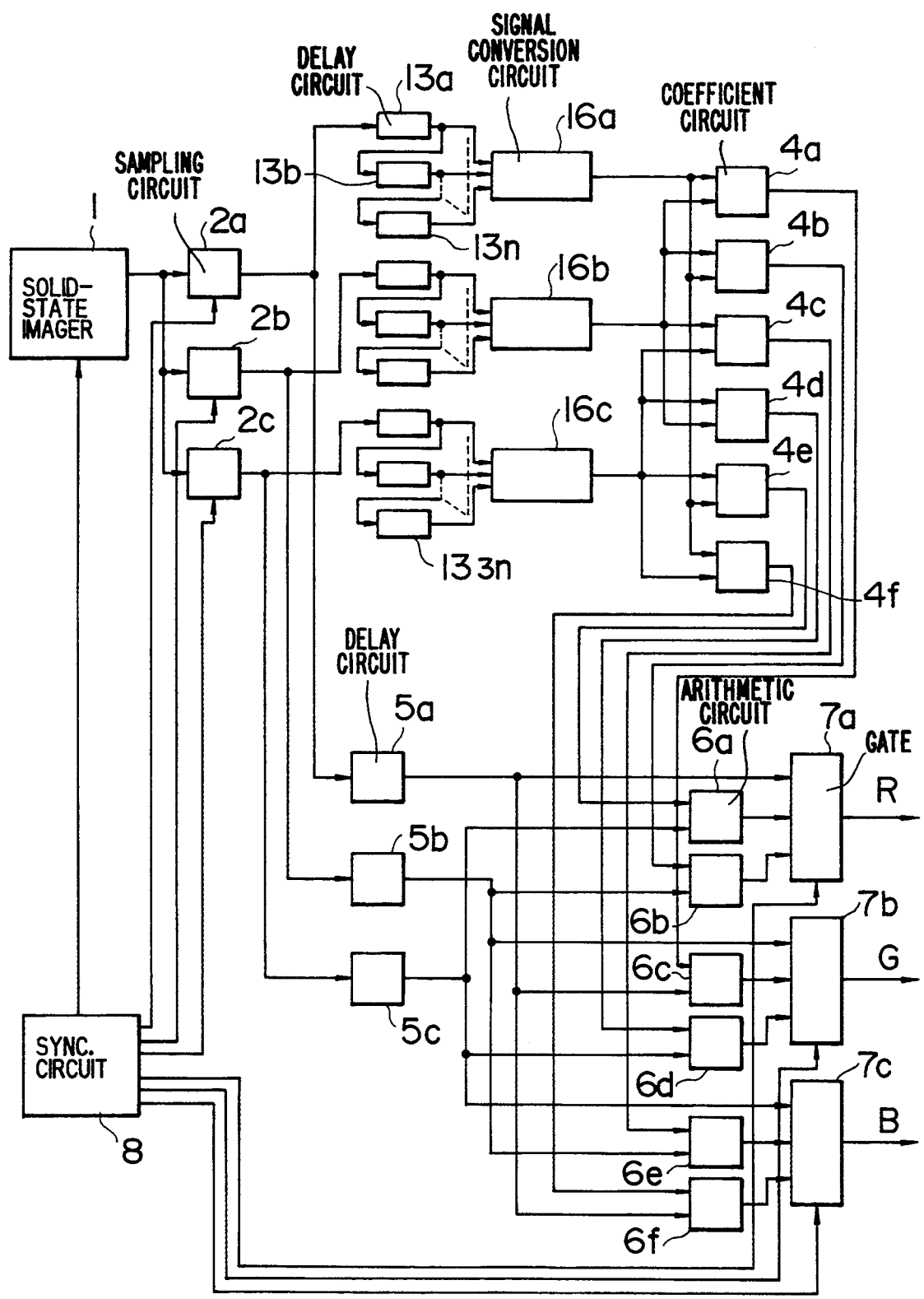

Also, the horizontal and vertical interpolations may be effected in parallel by the method described below. In the apparatus shown in FIG. 12, a signal obtained by horizontal interpolation through a configuration similar to that of FIG. 1 is combined with a signal produced by vertical interpolation through a configuration similar to that of FIG. 11 by combination circuits 14a, 14b, 14c. As an example of the operation of the combination circuits 14a, 14b, 14c, an average value of two input signals may be produced as an output signal. Numerals 15a, 15b, 15c designate delay circuits for correcting the delay time due to the horizontal and vertical processes. This function may be performed alternatively by the component means 13a, 13b, ... Also, in the apparatus shown in FIG. 13, the conversions in horizontal and vertical directions that have thus far been effected independently by the conversion circuits 3a to 3c and 3a' to 3c' in FIG. 12 are performed in two-dimensional signal conversion by two-dimensional signal conversion circuits 16a, 16b, 16c. The operation of the two-dimensional signal conversion, which is established as a well-known technique, will not be explained in detail, although the two-dimensional low-pass filter, the discrete cosine translation (DCT), etc. are applicable to such an operation. The chrominance signal that cannot be produced at a particular time point is interpolated by use of the ratio between the output signals of the two-dimensional conversion circuits thus made available by the same operation as in the other embodiments.

The probability that the pixels of the signal produced at the particular time point form an edge along both horizontal and vertical directions of an image is generally so low that the residual components of the false chrominance signal could be further reduced by using a method of parallel interpolation in horizontal and vertical directions as mentioned above.

The foregoing explanation concerns a case in which each chrominance signal is produced for each sampling period of pixels from an output signal of a solid-state imager for producing three types of chrominance signals alternately. It is also possible, however, to expand the concept of the above-mentioned embodiments of the invention to a case in which each signal is reproduced for each sampling period from two or more signals having a large correlationship with each other sampled and arranged in a predetermined sequence.

Also, apart from the aforementioned cases where the signal produced at a particular time point has the same sampling frequency as the interpolated signal, it is obvious that the same advantage is obtainable with equal effect also in the case where the two signals have different sampling frequencies.

Without employing hardware means with reference to which embodiments of the present invention have been described above, a similar effect may be obviously realized by use of software means with a general-purpose computer or the like.

It will thus be understood from the foregoing description that according to the present invention, there is provided a signal interpolation apparatus in which a plurality of chrominance signals similar to those signals originally to be obtained from an image in a sampling period of pixels are produced at the same time at an edge of the image regardless of whether the brightness thereof undergoes a sharp or gradul change, thus making it possible to reduce the generation of a false signal sufficiently.

I claim:

1. A signal interpolation apparatus for generating a plurality of types of signals interpolated at a predetermined period by using a signal source outputted by means for selecting a plurality of types of signals having a predetermined relationship with an original signal reflected from an object sequentially and repetitively, said apparatus comprising:
    first sampling means for sampling a first signal train of the same type as a first signal sampled at a given time point among the plurality of types of signals included in the signal source;
    second sampling means for sampling a second signal train of a type different from the first signal train from the signal source;
    first and second converters for converting output signals from the first and second sampling means into a predetermined form respectively;
    coefficient means for determining a coefficient of an output signal of the second converter in contrast to an output signal of the first converter;
    a multiplier for performing a multiplication operation between an output signal of the coefficient means and the first signal train before conversion; and
    interpolation means for interpolating the output signal of the second sampling means with an output signal of the multiplier.

2. A signal interpolation apparatus according to claim 1, wherein the first and second converters for effecting conversion into a predetermined form are low-pass filters for producing a low-frequency component of an input signal.

3. A signal interpolation apparatus according to claim 1, wherein said first and second sampling means produce signals of the same type as selected one of the first and second signal trains from a signal source in the form of a spatially horizontal signal train.

4. A signal interpolation apparatus according to claim 1, wherein said first and second sampling means produce signals of the same type as selected one of the first and second signal trains from a signal source in the form of a spatially vertical signal train containing the first signal.

5. A signal interpolation apparatus for generating a plurality of types of signals interpolated at a predetermined period by using a signal source outputted by means for selecting a plurality of types of signals having a predetermined relationship with an original signal reflected from an object sequentially and repetitively, said apparatus comprising:
    first sampling means for sampling a first signal train of the same type as a first signal sampled at a given time point among the plurality of types of signals included in the signal source;
    second sampling means for sampling a second signal train of a type different from the first signal train from the signal source;
    first and second converters for converting output signals from the first and second sampling means into a predetermined form respectively;
    coefficient means for determining a coefficient of an output signal of the second converter in contrast to an output signal of the first converter;
    a multiplier for performing a multiplication operation between an output signal of the coefficient means and the first signal train before conversion; and
    interpolation means for interpolating the output signal of the second sampling means with an output signal of the multiplier;
    wherein first and second converters for effecting conversion into a predetermined form produces an output signal obtained from the sum of square of the frequency component of an input signal over a predetermined area of the frequency component.

6. A signal interpolation apparatus for generating a plurality of types of signals interpolated at a predetermined period by using a signal source outputted by means for selecting a plurality of type of signals having a predetermined relationship with an original signal reflected from an object sequentially and repetitively, said apparatus comprising:
    first sampling means for sampling a first signal train of the same type as a first signal sampled at a given time point among the plurality of types of signals included in the signal source;
    second sampling means for sampling a second signal train of a type different from the first signal train from the signal source;

first and second converters for converting output signals from the first and second sampling means into a predetermined form respectively;

coefficient means for determining a coefficient of an output signal of the second converter in contrast to an output signal of the first converter;

a multiplier for performing a multiplication operation between an output signal of the coefficient means and the first signal train before conversion; and interpolation means for interpolating the output signal of the second sampling means with an output signal of the multiplier;

wherein the first and second converters for effecting conversion into a predetermined form produces an output signal from the sum of squares of instantaneous values of a signal corresponding to a low-frequency component of an input signal over a predetermined length of time.

7. A signal interpolating method for generating a plurality of types of signals interpolated in a predetermined period from a signal source outputted by means for sequentially and repetitively selecting at regular intervals of time a plurality of types of signals having a predetermined correlation with an original signal reflected from an object, said method comprising the steps of:

sampling a first signal train of the same type as a first signal sampled at a given sampling point among the plurality of signals included in the signal source;

sampling a second signal train of a type different from the first signal train from the signal source;

converting the first and second signal trains into a predetermined form to produce first and second conversion output signals respectively;

determining a coefficient of the second conversion output signal in contrast to the first conversion output signal;

effecting a multiplication operation between the coefficient and the first signal train delayed for a predetermined period; and interpolating the second signal train by the signal obtained by the multiplication operation.

8. A signal interpolation method according to claim 7, wherein said first and second signal trains are converted into a predetermined form by a low-pass filter for producing a low-frequency component of the input signal.

9. A signal interpolation method according to claim 7, wherein said first and second signal trains are converted into a predetermined form to produce an output signal by subjecting the frequency component of an input signal to square integration over a predetermined area of frequency.

10. A signal interpolation method according to claim 7, wherein said first and second signal trains are converted into a predetermined form to produce an output signal by subjecting instantaneous values of a signal corresponding to the low-frequency component of an input signal to square integration over a predetermined period.

11. A signal interpolation method according to claim 7, wherein said first and second signal trains are produced in a form of the same type as selected one of the first and second signal trains from a signal source in spatially horizontal direction.

12. A signal interpolation method according to claim 7, wherein said first and second signal trains are produced from the signal source so that signals, of the same type as a selected one of first and second signals, is selected in the form of the first and second signal trains containing the first signal in a spatially vertical direction.

* * * * *